United States Patent Office 2,768,729
Patented Oct. 30, 1956

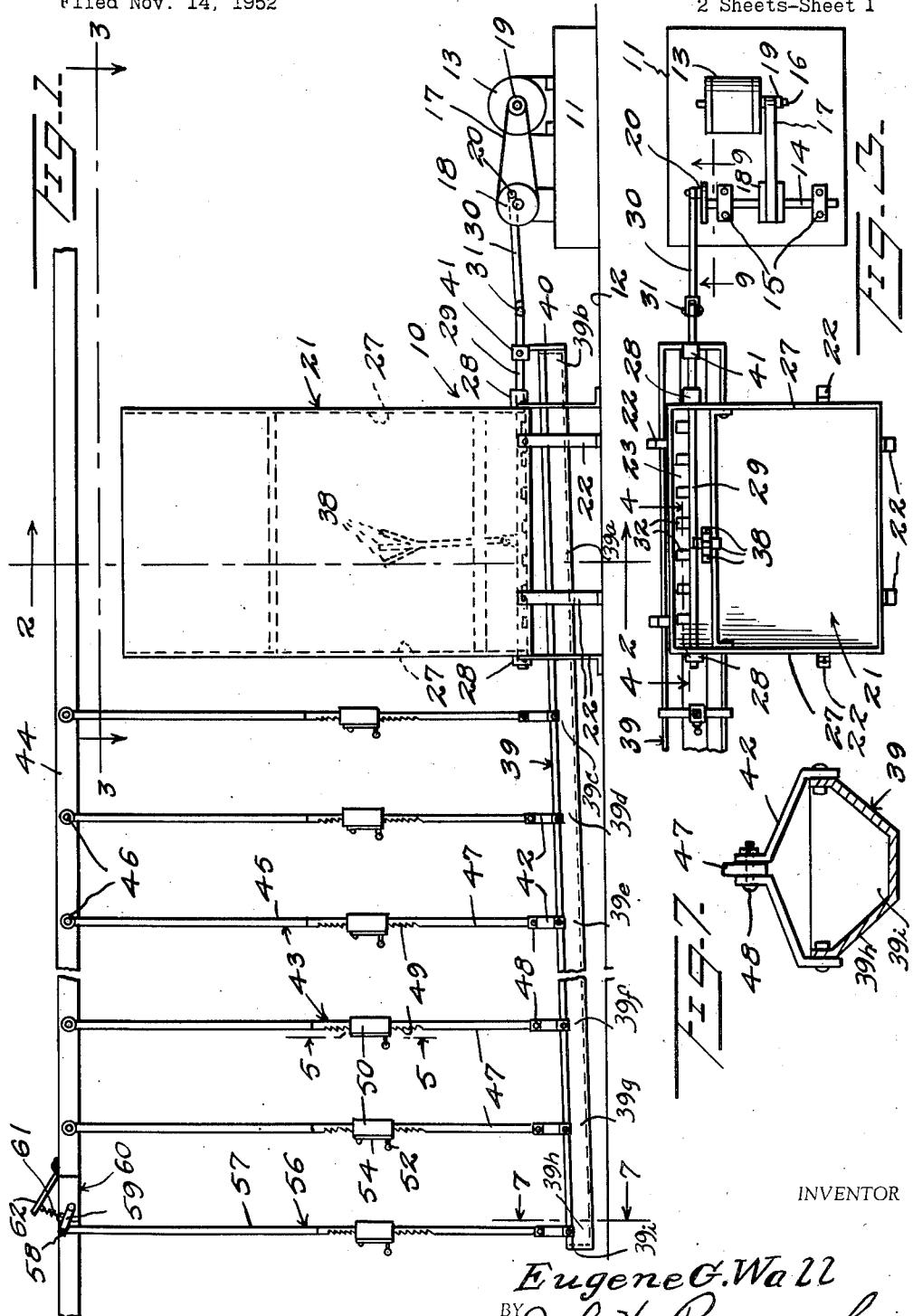

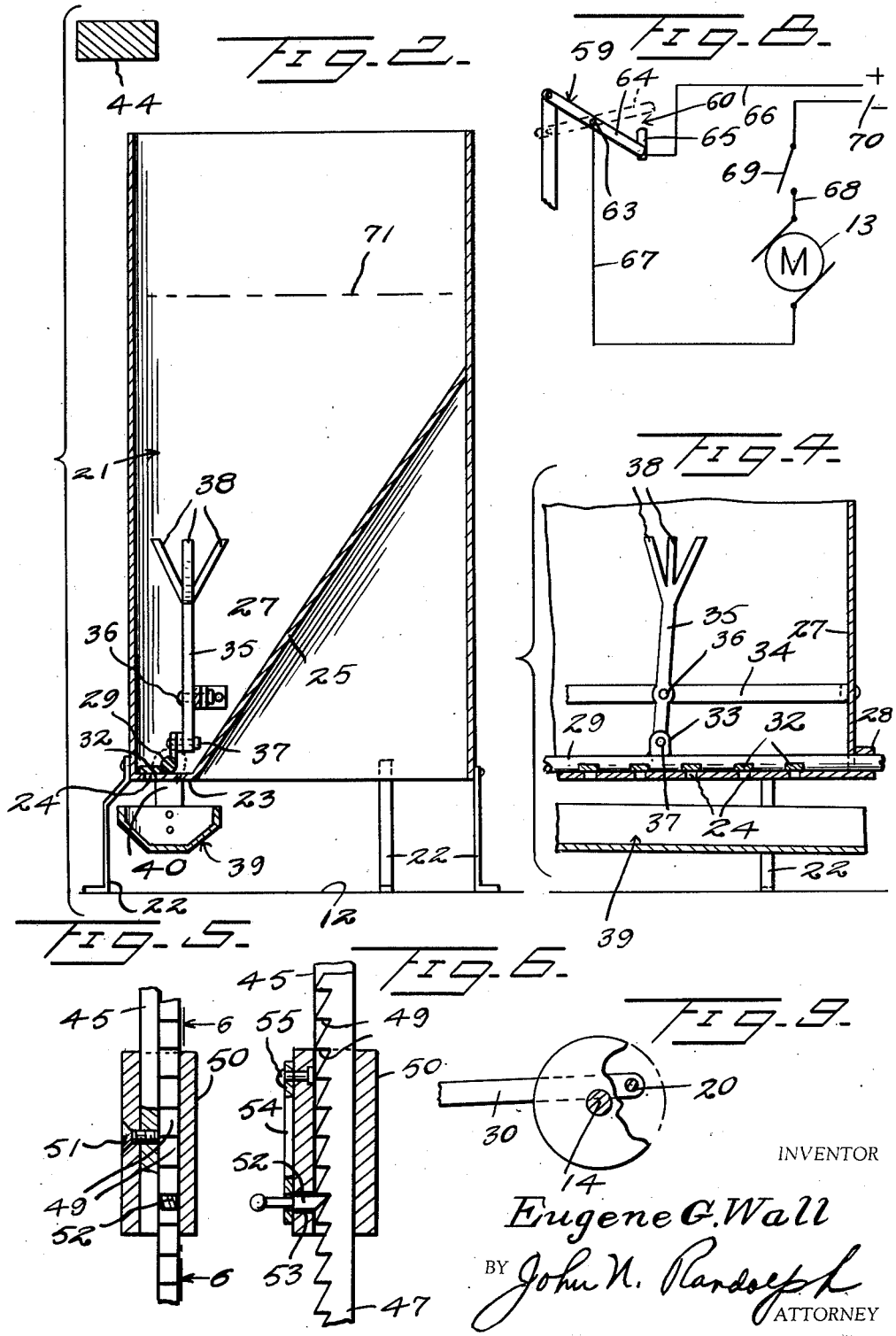

2,768,729

AUTOMATIC CHICKEN FEEDER

Eugene G. Wall, Carthage, N. C.

Application November 14, 1952, Serial No. 320,439

6 Claims. (Cl. 198—56)

This invention relates to a novel construction of automatic chicken feeder including a means automatically actuated by the amount of feed in a trough for actuating a dispensing and agitating means for replenishing the supply of feed in the trough when it becomes low and for thereafter interrupting the operation of the dispensing and agitating means when the supply of feed has been replenished in the trough.

Another object of the invention is to provide an apparatus which will additionally function for distributing the feed over the entire length of the trough as it is dispensed into the trough.

A further object of the invention is to provide an automatic chicken feeder which is readily adjustable for varying the amount of feed which will be supplied to a trough when the supply therein becomes low.

Various other objects and advantages of the invention will hereinafter become more fully apparent from the following description of the drawings, illustrating a presently preferred embodiment thereof, and wherein:

Figure 1 is a side elevational view of the automatic chicken feeder;

Figure 2 is a cross sectional view thereof taken substantially along a plane as indicated by the line 2—2 of Figure 1, on an enlarged scale;

Figure 3 is a fragmentary top plan view partly in horizontal section, taken substantially along a plane as indicated by the line 3—3 of Figure 1;

Figure 4 is a fragmentary vertical sectional view taken substantially along a plane as indicated by the line 4—4 of Figure 3;

Figure 5 is an enlarged vertical sectional view taken substantially along a plane as indicated by the line 5—5 of Figure 1;

Figure 6 is a vertical sectional view taken substantially along a plane as indicated by the line 6—6 of Figure 5;

Figure 7 is an enlarged cross sectional view taken substantially along a plane as indicated by the line 7—7 of Figure 1;

Figure 8 is primarily a diagrammatic view illustrating the electric circuit and control switch for automatically operating the feeder, and Figure 9 is a sectional view taken substantially along a plane as indicated by the line 9—9 of Figure 3.

Referring more specifically to the drawings, the automatic chicken feeder in its entirety is designated generally 10 and includes a suitable base member or block 11 which may be secured in any desired manner to a supporting surface such as a floor 12 and on the upper surface of which is secured an electric motor 13. A shaft 14 is journalled in pillow blocks or bearings 15 which are secured to and rise from the base 11 and said shaft is disposed parallel to an armature shaft 16 of the electric motor 13 and is connected thereto by a V-belt 17 and pulleys 18 and 19. The V-pulley 18 which is fixed to an intermediate portion of the shaft 14 is substantially larger than the V-pulley 19 which is fixed in the motor shaft 16. The shaft 14 is provided with a crank 20 at one end thereof.

A feed hopper 21 is supported above the floor or surface 12 on legs 22 which may be suitably fastened to said surface 12. The hopper 21 has a relatively narrow horizontal bottom portion 23 provided with a series of aligned outlet openings 24, and said hopper is provided with an inclined wall portion 25 extending upwardly at an incline from an inner side edge of the bottom portion 23. Opposite side walls 27 of the hopper 21 are provided with aligned externally flanged openings 28 for slidably receiving a portion of a rod 29 which extends across the hopper 21 above and adjacent the hopper bottom 23 and which is reciprocably disposed therein and in the flanged openings 28. A connecting rod or link 30 is pivotally connected at one end to the crank 20 and is pivotally connected at 31 at its opposite end to one end of the rod 29 which extends from the hopper 21 toward the crank 20. A plurality of valve elements 32 are fixed to the rod portion 29, which is disposed in the hopper 21, and are disposed for sliding engagement on the upper inner side of the hopper bottom 23 and for movement into positions over the discharge openings 24 for closing said openings or out of engagement with the openings 24 for exposing the openings. A lug 33 is fixed to and extends upwardly from a part of the rod 29, approximately midway of the portion thereof which is disposed in the hopper 21. A bar 34 extends through the hopper above the lug 33 and is secured at its ends to the hopper walls 27. An elongated agitator arm 35 is pivotally connected near its lower end to the bar 34 by a pin 36 and is pivotally connected at its lower end by a pin 37 to the upstanding lug 33. The arm 35 at its upper end and remote to the pivot 36 is provided with a plurality of upwardly diverging agitator fingers 38.

An elongated feed trough 39 has a portion 39a adjacent one end 39b thereof disposed directly beneath and longitudinally of the hopper bottom portion 23. A rigid arm 40 is fixed to and extends upwardly from the end 39b of the trough 39 and has a collar 41 on its upper end secured to the rod 29 between its pivot 31 and the adjacent flanged opening 28.

A plurality of yokes 42 are secured to and extend upwardly from the parts 39c, 39d, 39e, 39f, 39g and 39h of the trough 39 and are disposed in longitudinally spaced relationship to one another and on the portion of the trough disposed between the portion 39a and the trough end 39i which is located remote therefrom. The yokes 42 are fastened to the two sides of the trough 39 adjacent its open top.

A plurality of hanger members 43 are swingably suspended at their upper ends from an overhead beam or joist 44 which is disposed above the hopper 21 and trough 39. Each of the hangers 43 preferably includes an upper relatively elastic section 45, the upper end of which is connected at 46 to the joist or beam 44. Each hanger member 43 includes a lower section 47 which is preferably rigid and nonelastic and may comprise an elongated bar, the lower end of which is pivotally connected by a fastening 48 to the upper central portion of a yoke 42, disposed directly beneath said hanger 43, as best illustrated in Figure 7. One side edge of the upper end of each lower hanger section or bar 47 is provided with a series of outwardly and downwardly inclined teeth or notches 49, which toothed or notched upper end portion extends slidably through a sleeve 50 which is secured by a fastening 51 to the lower end of the upper elastic section 45 of the same hanger 43. A latch 52 extends inwardly through an opening 53 in one wall of the sleeve 50 toward the notched edge 49 of the bar 47 and is spring urged into engagement with a notch or tooth 49 of said bar by a leaf spring 54 which yieldably bears against the latch with its free end and which is secured at its opposite end by a fastening 55 to the outer side of the sleeve 50. The outermost yoke 42 which is connected to the trough part 39h adjacent the trough end 39i is supported by a hanger 56 which differs from the hangers 43 only in that its upper section 57 constitutes a rigid bar or nonelastic member which is pivotally connected at its upper end at 58 to one end of a switch lever 59 of an electric switch 60. A pull spring 61 is secured at its upper end to a spring anchor 62 which is mounted on the joist 44 and is connected at its lower end to the lever 59 adjacent the pivot 58 for urging said lever end and the hanger 56 upwardly. As illustrated in Figure 8, the switch lever 59 is pivotally mounted intermediate of its ends at 63 and the other end 64 thereof which forms an electrical conductor portion, slidably engages a conductor strip 65 which is connected to a conductor 66, leading from a source of electric current. When the end of the lever 59 which is pivoted at 58 to the hanger 56 is swung downwardly sufficiently the end 64 is swung upwardly out of engagement with the conductor strip 65, so that the switch 60 is then in an open or circuit interrupting position, as illustrated in dotted lines in Figure 8. A conductor 67 is connected to the conductor portion 64 of the lever adjacent the lever pivot 63 and extends therefrom to one pole or contact of the electric motor 13 and another conductor 68, in which a manual switch 69 is interposed, leads from the other pole of the motor 13 to the electric current source 70. As illustrated in Figure 1, the trough 39 is disposed at an incline downwardly from the upper end 39b thereof to the lower end 39i.

Assuming that the trough 39 is in the position as illustrated in Figure 1, in this position the trough will be substantially empty of feed and the switch lever 59 and hanger 56 will have been displaced upwardly to their positions of Figure 1 by the pull spring 61 so that the conductor portion 64 of the lever will have swung downwardly into engagement with the contact strip 65. Accordingly, assuming the switch 69 is closed, the electric motor 13 will then be energized for revolving the shaft 14 through its belt and pulley connections thereto to turn the crank 20 for reciprocating the rod 29. The reciprocating movement of the rod 29 will cause the feed 71 in the hopper 21 to be agitated by the swinging movement of the agitator fingers 38 and the feed will be dispensed through the discharge openings 24 of the hopper bottom 23 by a sifter action while the valve elements 32 are displaced out of engagement with said openings by reciprocating motion of the rod 29. Said valve elements 32 will slide back and forth into and out of positions over the openings 24 to allow the feed to be discharged therefrom by a sifter action while the openings 24 are exposed. The feed passing through the openings 24 falls by gravity into the trough portion 39a. At the same time, the trough 39 is reciprocated by its connection through the hanger 40 and collar 41 to the rod 29 so that due to its inclined disposition, the feed which is dispensed into the upper end of the trough from the hopper 21 will flow downwardly to fill the lower end of the trough. The swingably mounted hangers 43 and 56 which are pivotally connected to the yokes 42 permit the trough 39 to be freely reciprocated by the rod 29. As the lower end 39i of the trough is filled, the hanger portions 45 stretch sufficiently so that the hanger member 56 can be displaced downwardly to rock the lever 59 counterclockwise toward its dotted line position of Figure 8 to cause the conductor portion 64 thereof to swing upwardly and out of engagement with the contact strip 65 to thus break the circuit to the motor 13 to interrupt dispensing of the feed 71 from the hopper 21 and distribution of the feed lengthwise of the trough 39. Thereafter, as the trough 39 is emptied by poultry feeding therefrom, the weight of the lower end of the trough will be lessened so that the elastic hanger portions 45 will retract and together with the spring 61 will lift the trough and the hanger 56 to permit the lever 59 to swing clockwise back toward its position of Figure 1 and its full line position of Figure 8, to again close the switch 60 to thus refill the trough 39 with feed automatically from the hopper 71.

Obviously, the automatic feeder 10 may be used for feeding various types of poultry and livestock and may be made in various sizes. Various other modifications and changes are likewise contemplated and may obviously be resorted to, without departing from the spirit or scope of the invention as hereinafter defined by the appended claims.

I claim as my invention:

1. An automatic feeder of the character described comprising an elongated feed trough having an elevated end and a lower end, pivotally suspended hanger means connected to longitudinally spaced portions of said feed trough for swingably supporting the feed trough at an incline, said hanger means having yieldably extensible portions, a feed hopper having a bottom disposed above the elevated end of the feed trough and provided with an outlet discharging into the trough, valve means controlling the outlet of the hopper bottom, means connecting a portion of the trough to said valve means for imparting a reciprocating motion to the trough when the valve means is actuated, a driving means connected to said valve means, a control unit for starting and stopping said drive means including a hanger member having an upper end connected to the control unit and a lower end connected to the lower end of said trough for moving the control unit to a position for actuating the drive means when the lower end of the trough is elevated by said yieldable hanger portions and for moving said control unit to a position to interrupt the operation of the drive means when the trough is displaced downwardly by the weight of a full supply of feed therein.

2. An automatic feeder as in claim 1, said drive means including an electric motor, said control means comprising an electric switch for energizing and de-energizing the electric motor having a pivoted switch element connected to said hanger member, and spring means normally urging the switch to a circuit closing position against the gravity pull of said feed trough and the feed contained therein.

3. An automatic feeder as in claim 1, an agitator pivotally mounted for swinging movement in said hopper and having one end pivotally connected to said valve means whereby the agitator is oscillated when the valve means is actuated.

4. An automatic feeder of the character described comprising a feed containing hopper having an elevated bottom provided with an outlet, dispensing means connected to said hopper bottom for regulating the dispensing of feed from the outlet thereof when said dispensing means is actuated, drive means connected to the dispensing means for imparting motion thereto when the drive means is operated, a feed trough having an elevated end disposed beneath the hopper bottom for receiving the feed therefrom when the dispensing means is actuated, means connecting said dispensing means to the feed trough for reciprocating the feed trough when said dispensing means is actuated, said feed trough having an opposite lower end, a hanger having a lower end connected to and suspending the lower end of said feed trough, and a control unit having a portion to which the upper end of said hanger is pivotally connected, said control unit including spring means for urging the unit to a position for actuating the drive means and for elevating said hanger and the lower end of the trough, said hanger and the lower end of the trough being displaced downwardly by the weight of the trough when filled with feed for displacing said control unit to a position to interrupt operation of said drive means.

5. An automatic feeder as in claim 4, said drive means including an electric motor, and said control unit comprising an electric switch urged by the spring to a circuit closing position for energizing the electric motor and displaced to a circuit interrupting position by the weight of the trough when filled with feed.

6. An automatic feeder as in claim 4, and a plurality of corresponding hanger members having lower ends connected to longitudinally spaced portions of the trough and spaced from the trough ends, each of said complementary hanger members including a yieldably extensible section.

References Cited in the file of this patent

UNITED STATES PATENTS

| | | |
|---|---|---|
| 1,783,092 | Lewis | Nov. 25, 1930 |
| 1,926,659 | Tafel | Sept. 12, 1933 |
| 2,537,005 | Brown | Jan. 9, 1951 |
| 2,626,039 | Wetherington et al. | Jan. 20, 1953 |
| 2,634,706 | Peterson | Apr. 14, 1953 |

FOREIGN PATENTS

| | | |
|---|---|---|
| 758,028 | France | Jan. 9, 1934 |